UNITED STATES PATENT OFFICE.

JOHN LINDEN AND GUSTAV GIESELER, OF CHICAGO, ILLINOIS.

IMPROVEMENT IN COMPOUNDS FOR ARTIFICIAL STONE.

Specification forming part of Letters Patent No. 179,706, dated July 11, 1876; application filed January 8, 1876.

*To all whom it may concern:*

Be it known that we, JOHN LINDEN and GUSTAV GIESELER, of Chicago, Cook county, State of Illinois, have invented a new and useful Compound for Artificial Stone, of which the following is a full description:

Our artificial stone consists of sharp sand or other similar suitable material, Portland cement or other similar cement, silicate of soda, borax, alum, and sulphuric acid.

To prepare the artificial stone, take two parts of sharp sand and one part of Portland or other cement, and mix them dry. Take, also, one ounce of sulphuric acid, two ounces of silicate of soda, four ounces of alum, eight ounces of borax, and dissolve them in three gallons of water. This solution will be too strong for use, and when used is to be weakened by adding to one quart thereof about two gallons of clear water. A sufficient quantity of this weakened solution is then to be thoroughly mixed with the sand and cement, to moisten the same, so that the sand and cement will adhere, and the same, so moistened, is to be shaped in suitable molds, forming square or other-shaped blocks or ornamental forms, as usual.

After the blocks have been formed they are to be set aside, under cover, and are to be sprinkled with water two or three times a day, or oftener, if necessary, for three or four or five days.

In forming blocks of considerable size, we use a coarse material for the central portion, consisting of broken brick or stone, or gravel or cinders, or other similar material, as follows: We fill the bottom and line the sides of the open mold with the composition described, leaving an open central place in the material, into which we put a suitable quantity of broken brick, or other material, and then cover the same and mix it with the first-mentioned composition, and fill the mold therewith, thus giving to the whole block a fine face. The coarse material in the center does not impair the strength of the block.

We do not limit ourselves to the exact proportions described, as they may be somewhat varied.

The sulphuric acid is useful in preventing spots which frequently appear on artificial stones; the borax assists in hardening the stone; the alum we find to be beneficial. The use of silicate of soda is well understood.

What we claim as new, and desire to secure by Letters Patent, is as follows:

A composition of sand and cement mixed with a solution of sulphuric acid, silicate of soda, alum, borax, and water, substantially as and for the purpose set forth.

JOHN LINDEN.
GUSTAV GIESELER.

Witnesses:
E. A. WEST,
O. W. BOND.